(12) United States Patent
Nehl

(10) Patent No.: US 6,416,267 B1
(45) Date of Patent: Jul. 9, 2002

(54) SLEEVE-FORM TWO-MATERIAL EXPANSIBLE FIXING PLUG WITH A HIGH TORSIONAL STIFFNESS

(75) Inventor: Wolfgang Nehl, Waldachtal (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/807,313
(22) PCT Filed: Aug. 27, 1999
(86) PCT No.: PCT/EP99/06330
§ 371 (c)(1),
(2), (4) Date: Apr. 11, 2001
(87) PCT Pub. No.: WO00/32947
PCT Pub. Date: Jun. 8, 2000

(30) Foreign Application Priority Data

Nov. 30, 1998 (DE) .......... 198 55 139

(51) Int. Cl.[7] .............. F16B 132/04
(52) U.S. Cl. .............. 411/80.5; 411/901; 411/907; 411/908
(58) Field of Search .............. 411/900, 901, 411/902, 904, 907, 908, 80.1–80.6, 182, 183

(56) References Cited

U.S. PATENT DOCUMENTS 983,451 A * 2/1911 Kennedy
1,668,594 A * 5/1928 Karitzky
3,082,807 A * 3/1963 Tinnerman
3,703,120 A * 11/1972 Van Buren
4,840,522 A * 6/1989 Kurihara
6,244,805 B1 * 6/2001 Everard

FOREIGN PATENT DOCUMENTS

| DE | 71 45 271 U | 2/1973 |
| DE | 33 46 793 A | 6/1985 |
| DE | 39 21 733 A | 1/1991 |
| FR | 2 529 970 A | 1/1984 |

* cited by examiner

Primary Examiner—Flemming Saether
(74) Attorney, Agent, or Firm—Michael J. Striker

(57) ABSTRACT

The invention relates to an expansible fixing plug (10), which is manufactured as a two-material fixing plug from a relatively soft and a relatively hard plastics material. To achieve a low insertion torque of an expansion screw as the expansible fixing plug (10) is expanded, yet nevertheless a high anchoring force, the invention proposes constructing from the relatively hard plastics material expansion fingers (22), having cross-sectional areas increasing in size in the direction towards the leading end of the expansible fixing plug (10), which expansion fingers are embedded in expansion tongues (14) of the relatively soft plastics material having a cross-section corresponding to a circular segment, the expansion tongues (14) being connected with one another by dilatation zones (16). (FIG. 8).

6 Claims, 2 Drawing Sheets

SLEEVE-FORM TWO-MATERIAL EXPANSIBLE FIXING PLUG WITH A HIGH TORSIONAL STIFFNESS

The invention relates to an expansible fixing plug having torsional stiffness, the expansible fixing plug extending in a longitudinal direction.

Such an expansible fixing plug is known from DE 39 21 733 A1. The known expansible fixing plug is manufactured as a two-material fixing plug from two materials of different hardness. In simplified terms, it consists of two sleeves assembled one inside the other by injection moulding, which are divided by a longitudinal slit into two expansible elements running in the longitudinal direction of the fixing plug. The outer sleeve consists of a relatively hard material and the inner sleeve consists of a relatively soft material. By screwing in an expansion screw, the expansible elements are expanded and the expansible fixing plug is anchored in a drilled hole. The hard material arranged on the outer surface of the fixing plug produces good anchoring with high retention force in the drilled hole, whilst the effect of the soft material, into which the expansion screw is screwed, is that the insertion torque of the expansion screw is low.

The known expansible fixing plug has the disadvantage that the screw can run off centre as it is being screwed in, that is, it screws off-axis into the expansible fixing plug and passes through the longitudinal slit that divides the fixing plug into the expansion elements and out of the side of the fixing plug. A further disadvantage of the known expansible fixing plug is its low torsional stiffness; screwing in the expansion screw causes the rear end of the fixing plug to twist relative to the leading end of the fixing plug.

The invention is based on the problem of constructing a two-material expansible fixing plug of the kind mentioned in the introduction so that it has a high torsional stiffness and as the expansion screw is screwed in it runs in the longitudinal direction of the fixing plug.

That problem is solved in accordance with the invention by the features of claim 1.

The expansible fixing plug according to the invention has expansion fingers, which run substantially in the longitudinal direction of the fixing plug and which consist of the relatively hard material. The expansion fingers of the relatively hard material are arranged at the outer circumference of the expansible fixing plug. In a hole drilled in a solid building material, the expansion fingers are pressed by the expansion screw against the wall of the drilled hole as the expansion screw is screwed into the expansible fixing plug, and the expansible fixing plug is consequently anchored in the drilled hole with high retention force. The relatively soft material joins the expansion fingers to one another circumferentially, the joint being made preferably continuous in the longitudinal direction of the expansible fixing plug, although it may alternatively be discontinuous. The soft material presents only slight resistance to expansion of the expansion fingers, so that expansion is not appreciably impeded and the insertion torque of the expansion screw is not appreciably increased. At the same time, the soft material increases the torsional stiffness of the expansible fixing plug. Moreover, the relatively soft material forms an expansion hole that is closed circumferentially and in this way prevents the screw from being screwed off-axis into the expansible fixing plug and emerging through the side of the fixing plug. Moreover, the relatively soft material reduces the insertion torque of the expansion screw.

When anchoring the expansible fixing plug according to the invention in a hollow building material, the relatively soft material joining the expansion fingers circumferentially limits the expansion of the expansion fingers. Screwing the expansion screw into the expansible fixing plug in a hollow building material causes the expansion fingers to bow out in a curve in the longitudinal direction of the fixing plug, and the expansible fixing plug is anchored in the hollow building material by interlocking engagement. The relatively soft material joining the expansion fingers circumferentially prevents the expansion fingers from buckling or becoming tangled together in a knot. The insertion torque of the expansion screw is prevented, after an increase, from falling to a low value again, as would be the case if the expansion fingers buckled or became entangled. A torque that decreases after an initial increase conveys the impression of poor anchoring and is therefore undesirable.

In one configuration of the invention, the cross-sectional area of the expansion fingers is larger in the region of the leading end of the expansible fixing plug and smaller in a rear part of the expansion zone; the cross-sectional area of the expansion fingers decreases over the expansion zone from the front end towards the rear. The effect of the smaller cross-sectional area of the expansion fingers consisting of the relatively hard material in the rear part of the expansion zone is that the insertion torque of the expansion screw at the start of screwing-in is low. The effect of the large cross-sectional area of the expansion fingers consisting of the relatively hard material in the region of the leading end of the expansible fixing plugs is that expansion is considerable and consequently good anchoring with high retention force is achieved. This feature optimizes the relationship between insertion torque, expansion, and anchoring force.

The leading end of the expansible fixing plug preferably consists entirely of the relatively hard material. In particular, a ring or hollow cylinder of the relatively hard material is formed at the leading end of the expansible fixing plug, into which the expansion screw is screwed as the expansible fixing plug is expanded. This configuration of the invention has the advantage of good anchoring. A further advantage of this configuration of the invention is that the leading end of the expansible fixing plug consisting entirely of the relatively hard material forms a kind of nut, by means of which the expansible fixing plug is axially compressed when the expansion fingers are bowed out in a hollow building material and hence become disengaged from the screw thread of the expansion screw.

The relatively soft material joining the expansion fingers circumferentially forms circumferentially dilatable dilatation zones. In this connection, in one configuration of the invention the dilatability in the circumferential direction of the expansible fixing plug is achieved by a folded portion of the relatively soft material joining the expansion fingers, the folded portion having folds running in the longitudinal direction of the fixing plug. The dilatability is here achieved by a change in shape, namely an opening-out, of the folded portion, and not or only partly by a material dilatation of the relatively soft material. This has the advantage of a greater dilatability and a defined limit of the dilatation circumferentially. The effect of this defined limitation of the dilatation is a defined limited width of the bowing of the expansion fingers on expansion of the expansible fixing plug in a hollow building material.

In one configuration of the invention, expansion tongues are formed from the relatively soft material, into which the expansion fingers consisting of the relatively hard material are embedded. The effect of having the expansion tongues of the relatively soft material in addition to the expansion fingers of the relatively hard material is that the expansible fixing plug adapts better to a drilled hole. In a hole drilled in a hard solid building material, the relatively soft material is displaced by screwing in the expansion screw and consequently too high an insertion torque is prevented. The expansion fingers of the hard material effect good anchoring with high retention force. In a hole drilled in less hard building material, the effect of the expansion tongues is a greater expansion of the expansible fixing plug and consequently likewise good anchoring of the expansible fixing plug in the building material. Moreover, the expansion tongues of the relatively soft material mould themselves to irregularities and the like in the wall of a drilled hole and hence also effect good anchoring with high retention force.

The invention is explained in detail below with reference to an exemplary embodiment illustrated in the drawings, in which.

Figure 1:
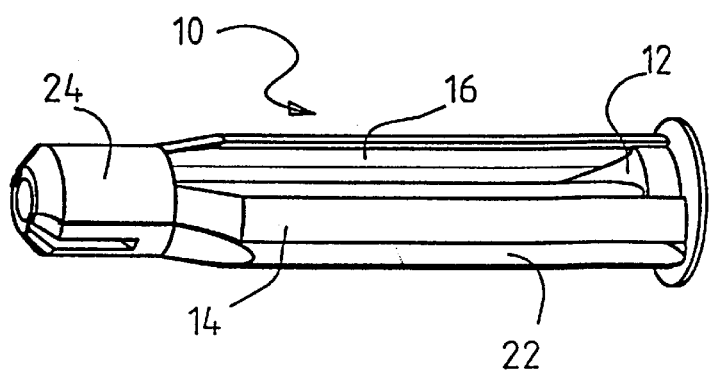
FIG. 1 is a perspective view of an expansible fixing plug according to the invention.
Figure 2:
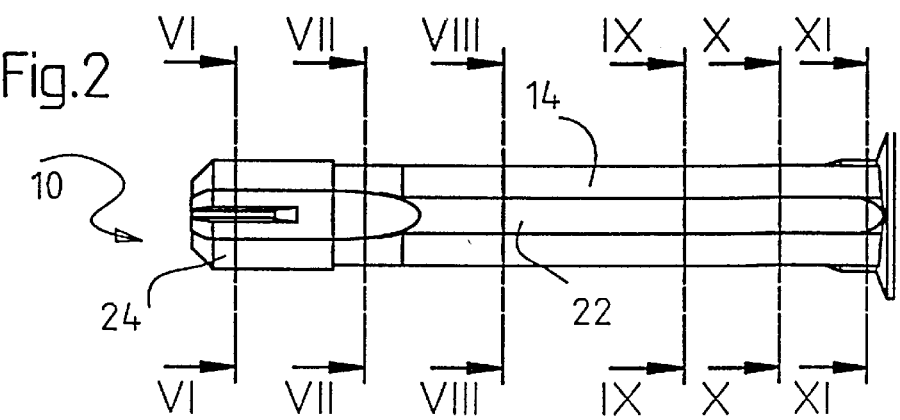
FIG. 2 is a side view of the expansible fixing plug from FIG. 1.
Figure 6:
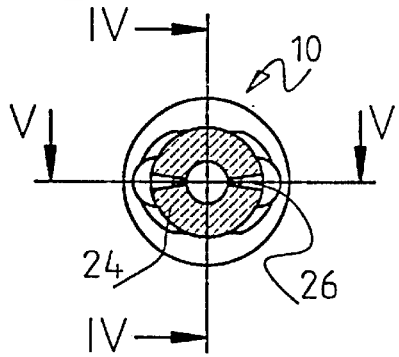
FIGS. 6 to 11 are transverse sections of the expansible fixing plug from FIG. 1 in the planes indicated in FIG. 2 by VI—VI to XI—XI.
Figure 7:
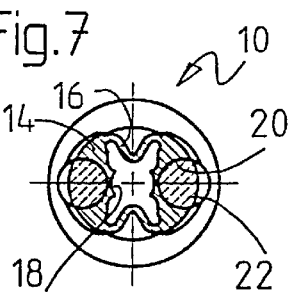
Figure 8:
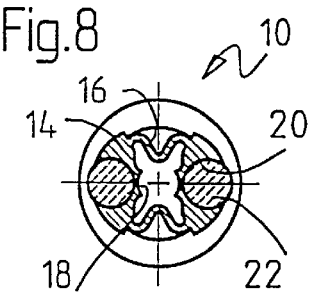
Figure 9:
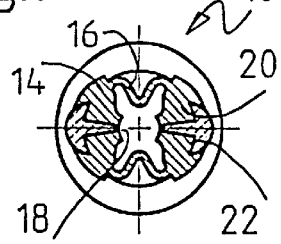
Figure 10:
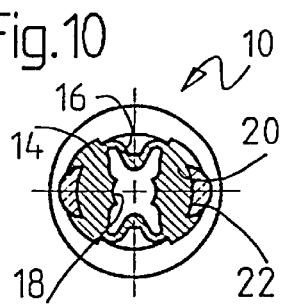
Figure 11:
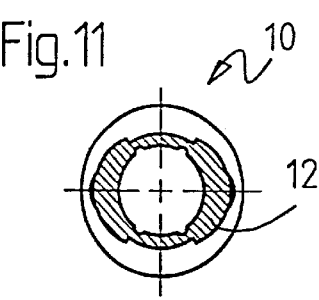
Figure 3:
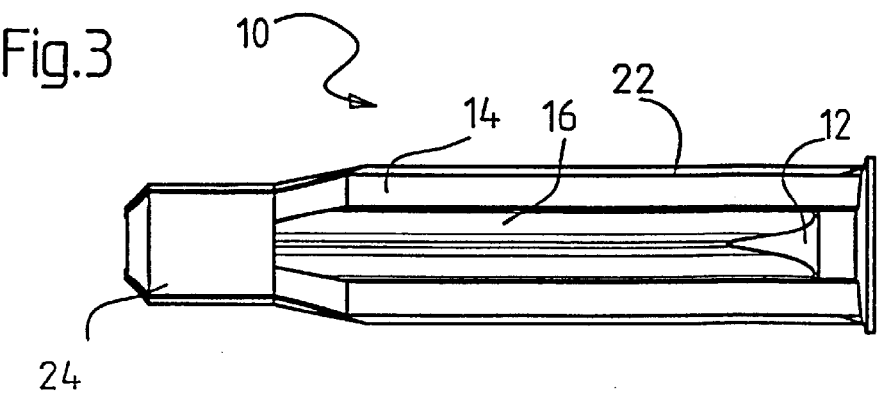
FIG. 3 is a view of the expansible fixing plug from FIG. 1 rotated through 90° relative to FIG. 2.
Figure 4:
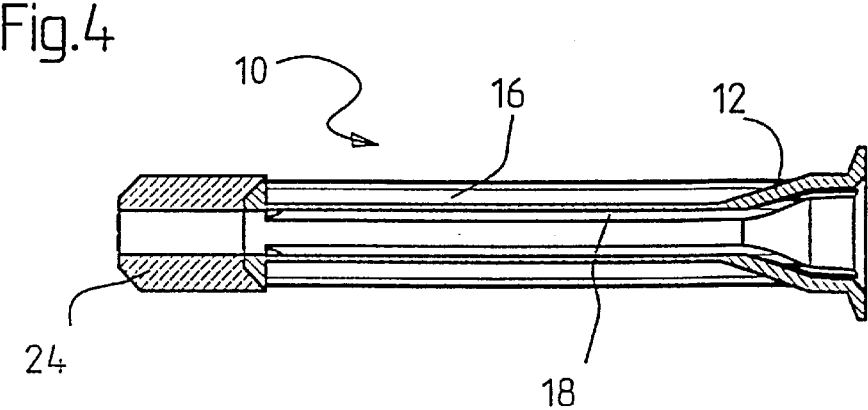
FIG. 4 is an axial section of the expansible fixing plug from FIG. 1 along the line IV—IV in FIG. 6.
Figure 5:
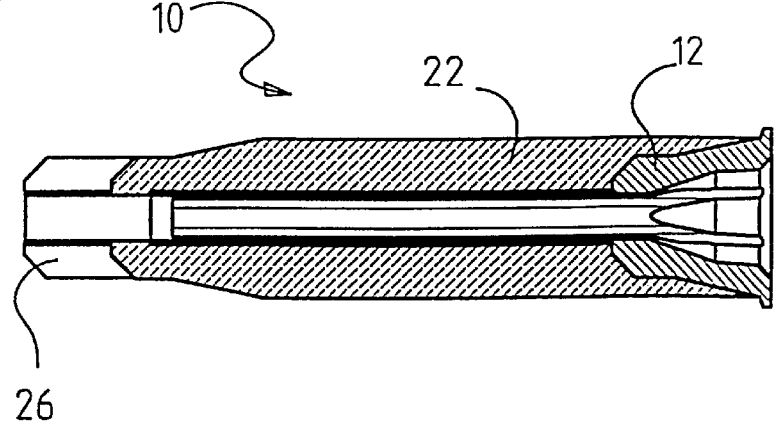
FIG. 5 is an axial section of the expansible fixing plug from FIG. 1 along the line V—V in FIG. 6.

The expansible fixing plug 10 illustrated in the drawings is manufactured as a two-material fixing plug by injection moulding from two plastics material of different hardness. At its rear end, the expansible fixing plug 10 has a funnel portion 12, which is provided for insertion of an expansion screw, not illustrated. The funnel portion 12 consists of the relatively soft plastics material. From the funnel portion 12, two expansion tongues 14 arranged lying opposite one another extend towards the leading or insertion end of the expansible fixing plug 10. The expansion tongues 14 are integral with the funnel portion 12 and likewise consist of the relatively soft plastics material. The expansion tongues 14 each have a cross-section approximately in the shape of a segment of a circle, as is readily apparent from FIGS. 7 to 10. On their outsides, the expansion tongues 14 are joined to one another by the relatively soft plastics material of which the expansion tongues 14 also consist. In the region of the join, the relatively soft plastics material is thin, and has folded portions running in the longitudinal direction of the fixing plug, the folded portions merging integrally into the expansion tongues 14. The thin part of the relatively soft plastics material, which has folded portions and joins the expansion tongues 14 to one another, forms dilatation zones 16 running in the longitudinal direction of the fixing plug, which are dilatable in the circumferential direction of the expansible fixing plug 10, so that the expansion tongues 14 can be expanded by screwing in the expansion screw, not illustrated, between the expansion tongues 14. For axial guidance of the expansion screw, on their facing surfaces the expansion tongues 14 have guide grooves 18 running in the longitudinal direction of the fixing plug.

The dilatation zones 16 joining the expansion tongues 14 to one another increase a torsional stiffness of the expansible fixing plug 10. Moreover, they form an expansion hole that is closed circumferentially, and prevent the expansion screw from emerging between the expansion tongues 14 to the side as it is screwed into the expansible fixing plug 10.

On their outsides, the expansion tongues 14 consisting of the relatively soft plastics material have outwardly open grooves 20 of changing cross-section running in the longitudinal direction of the fixing plug. Expansion fingers 22 that consist of a relatively hard plastics material are embedded in the grooves 20. At their leading ends, the expansion fingers 22 merge integrally into a kind of sleeve 24, which forms the leading end of the expansible fixing plug 10 and which contains no relatively soft plastics material. The sleeve 24 is closed all round and has two expansion slots 26 running in the longitudinal direction of the fixing plug. The expansion slots 26 make the sleeve 24 easier to expand as the expansion screw is screwed in, and the expansion screw is therefore easier to screw in.

At the outer circumference of the expansible fixing plug 10, the expansion fingers 22 consisting of the relatively hard plastics material protrude beyond the expansion tongues 14, in which they are embedded. The cross-sectional area of the expansion fingers 22 reduces in the longitudinal direction of the fixing plug from the leading end towards the rear. In the vicinity of the leading end of the expansible fixing plug, the expansion fingers 22 each have an approximately circular cross-section (FIGS. 7 and 8), which changes gradually towards the rear end of the expansible fixing plug 10 into a hammer head or T-shaped cross-section with a circular outer surface (FIG. 9), and then on from that into a crescent-shaped cross-section (FIG. 10) in the region of the rear end of the expansible fixing plug 10. The cross-sectional shape of the expansion fingers 22 that changes in the longitudinal direction of the fixing plug is chosen so that the cross-sectional area of the expansion fingers 22 reduces from the leading end towards the rear, and so that the expansion fingers 22, at least for the majority of their length, extend a long way inwards close up to the expansion hole passing axially through the expansible fixing plug 10 for screwing in the expansion screw. Between the expansion hole, or that is to say the expansion screw to be screwed into the expansible fixing plug 10, and the expansion fingers 22, there is only a thin layer of the relatively soft plastics material.

For manufacture of the expansible fixing plug 10 according to the invention, first of all the part 12, 14, 16 of the expansible fixing plug 10 consisting of the relatively soft plastics material is injection-moulded. The relatively hard plastics material forming the expansion fingers 22 and the sleeve 24 is then injected onto the relatively soft plastics material already injected. In this connection, provision is made for both plastics materials to be injected in one injection mould. A core that forms the expansion hole of the expansible fixing plug 10 is placed in the cavity of the injection mould, not shown. A further core, which fills the space of the relatively hard plastics material to be injected subsequently, is also placed in the cavity of the injection mould and the part 12, 14, 16 of the expansible fixing plug 10 consisting of the relatively soft plastics material is injected. The said last core is subsequently pulled axially out of the cavity of the injection mould, axially by the length of the part 22, 24 of the expansible fixing plug 10 consisting of the hard plastics material, whereby, in the cavity in which the already injected part 12, 14, 16 of the expansible fixing plug 10 consisting of the relatively soft plastics material is located, a void is produced, having the shape of the part 22, 24 of the expansible fixing plug 10 consisting of the relatively hard plastics material yet to be injected. The relatively hard plastics material is injected into this void and onto the part 12, 14, 16 of the expansible fixing plug 10 consisting of the relatively soft plastics material. The finished two-material expansible fixing plug 10 is then removed from the injection mould.

The function of the expansible fixing plug 10 is as follows: the expansible fixing plug 10 is anchored in a hole drilled in a solid building material, such as concrete for example, by inserting the expansible fixing plug 10 in the drilled hole and screwing an expansion screw, not illustrated, into the expansion hole of the expansible fixing plug 10 between the expansion tongues 14. The expansion screw is screwed right into the sleeve 24. It expands the expansible fixing plug 10 and accordingly anchors this in a manner known per se in the drilled hole. The expansion fingers 22 consisting of the relatively hard plastics material, which extend inwards as far at the expansion screw and are acted upon by this almost directly, effect a secure hold with high anchoring force in the drilled hole. The expansion tongues 14 of the relatively soft plastics material can be displaced by the expansion screw comparatively easily, so that the insertion torque remains low. The small cross-sectional area of the expansion fingers 22 consisting of the hard plastics material in the region of the rear end of the expansible fixing plug 10 provides for easy screwing in of the expansion screw at the start of the screwing-in operation. The cross-sectional area of the expansion fingers 22 that increases towards the leading end of the expansible fixing plug 10 right into the sleeve 24 provides for a considerable expansion, and consequently a high anchoring force, of the expansible fixing plug 10.

If the expansible fixing plug 10 is inserted in a hole drilled in a hollow building material, such as a brick or a cavity block for example, the expansion tongues 14, together with the expansion fingers 22, are spread apart from one another by screwing in the expansion screw. The dilatation zones 16, which connect the expansion tongues 14 with one another, limit the expansion width by which the expansion tongues 14 and the expansion fingers 22 can be spread apart from one another. The expansion tongues 14 and the expansion fingers 22 are consequently prevented from buckling outwards; they bow outwards in a curve into a cavity as the expansion screw is screwed into the sleeve 24 and tightened. The expansion creates an interlocking fit and hence a good anchorage of the expansible fixing plug 10 in the hollow building material. Because the dilatation zones 16 prevent the expansion tongues 14 and the expansion fingers 22 from buckling, in a hollow building material the sleeve 24 is prevented from being drawn with the expansion screw close up to the rear end of the expansible fixing plug 10. In addition, after an initial increase in torque as the expansion screw is screwed in after the start of buckling of the expansion tongues 15 and the expansion fingers 22, the insertion torque is prevented from decreasing sharply, which would convey the impression of a poor anchoring. When being anchored in a hollow building material, the expansible fixing plug 10 according to the invention therefore gives a feeling for the correct seating and good anchoring of the expansible fixing plug 10 through the increasing insertion torque of the expansion screw.

What is claimed is:

1. A two-material sleeve-form expansible fixing plug having torsional stiffness, said expansible fixing plug extending in a longitudinal direction and comprising:

a plurality of expansion tongues (14) extending in said longitudinal direction, each of said expansion tongues being connected with adjacent expansion tongues by dilation zones (16) so as to surround a circumferentially closed expansion hole, said expansion hole being formed to receive an expansion screw for expanding said fixing plug; and a number of expansion fingers (22) extending in said longitudinal direction, each of said expansion fingers (22) being embedded in a respective one of said expansion tongues (14) on a side thereof opposite from said expansion hole;

wherein said expansion fingers (22) consist of one material, said expansion tongues (14) and said dilation zones (16) consist of another material, wherein said one material is harder than said another material and said dilation zones (16) are laterally thinner than said expansion tongues (14), whereby insertion torque of said expansion screw is reduced.

2. The two-material sleeve-form expansible fixing plug as defined in claim 1 wherein the dilation zones (16) comprise folded portions separated by folds running substantially in said longitudinal direction.

3. The two-material sleeve-form expansible fixing plug as defined in claim 1, wherein said expansion tongues (14) are provided with guide grooves (18) for said expansion screw.

4. A two-material sleeve-form expansible fixing plug having torsional stiffness, said expansible fixing plug extending in a longitudinal direction and comprising:

a plurality of expansion fingers (22), each extending in said longitudinal direction and consisting of a comparatively hard material; and a comparatively soft material (14, 16) joining said expansion fingers (22) circumferentially so as to surround and bound a circumferentially closed expansion hole, said expansion hole being formed to receive an expansion screw for expanding said fixing plug;

wherein said expansion fingers (22) are arranged on an outer circumference of said fixing plug and said expansion fingers (22) have a cross-sectional area that decreases from a leading end to a rear end of the fixing plug.

5. The two-material sleeve-form expansible fixing plug as defined in claim 4, wherein the leading end of the expansible fixing plug (10) consists entirely of the comparatively hard material.

6. The two-material sleeve-form expansible fixing plug as defined in claim 4, wherein the expansible fixing plug (10) has dilation zones (16) of the relatively soft material connecting the expansion fingers (22), running substantially in the longitudinal direction of the fixing plug and dilatable circumferentially.

* * * * *